(12) United States Patent
Yang et al.

(10) Patent No.: US 9,893,376 B2
(45) Date of Patent: Feb. 13, 2018

(54) METHODS OF PREPARING ELECTRODE ASSEMBLY AND SECONDARY BATTERY

(71) Applicant: LG CHEM, LTD., Seoul (KR)

(72) Inventors: Young Joo Yang, Daejeon (KR); Ki Hong Min, Daejeon (KR); Chang Bum Ahn, Daejeon (KR)

(73) Assignee: LG CHEM, LTD., Seoul (KR)

( * ) Notice: Subject to any disclaimer, the term of this patent is extended or adjusted under 35 U.S.C. 154(b) by 381 days.

(21) Appl. No.: 14/424,416

(22) PCT Filed: Sep. 18, 2014

(86) PCT No.: PCT/KR2014/008682
§ 371 (c)(1),
(2) Date: Feb. 26, 2015

(87) PCT Pub. No.: WO2015/046803
PCT Pub. Date: Apr. 2, 2015

(65) Prior Publication Data
US 2016/0049687 A1    Feb. 18, 2016

(30) Foreign Application Priority Data
Sep. 26, 2013 (KR) .................. 10-2013-0114247
Aug. 21, 2014 (KR) .................. 10-2014-0108814

(51) Int. Cl.
| | | |
|---|---|---|
| *H01M 4/13* | (2010.01) | |
| *H01M 10/04* | (2006.01) | |
| *H01M 10/0585* | (2010.01) | |
| *H01M 2/16* | (2006.01) | |
| *H01M 2/18* | (2006.01) | |

(Continued)

(52) U.S. Cl.
CPC ..... *H01M 10/0436* (2013.01); *H01M 2/1673* (2013.01); *H01M 2/18* (2013.01); *H01M 4/13* (2013.01); *H01M 10/0585* (2013.01); *H01M 4/742* (2013.01); *H01M 10/052* (2013.01);
(Continued)

(58) Field of Classification Search
CPC .. H01M 2/18; H01M 2/1673; H01M 10/0585; H01M 2004/025; H01M 4/742
See application file for complete search history.

(56) References Cited

U.S. PATENT DOCUMENTS

| | | |
|---|---|---|
| 6,997,228 B2 | 2/2006 | Hong |
| 2001/0036573 A1 | 11/2001 | Jen et al. |

(Continued)

FOREIGN PATENT DOCUMENTS

| | | |
|---|---|---|
| CN | 1387276 A | 12/2002 |
| CN | 101562262 A | 10/2009 |

(Continued)

OTHER PUBLICATIONS

Machine translation of JP 2010-027368, obtained Jul. 31, 2017.*

(Continued)

*Primary Examiner* — Nicholas P D'Aniello
(74) *Attorney, Agent, or Firm* — Birch, Stewart, Kolasch & Birch, LLP

(57) ABSTRACT

Provided are a method of preparing an electrode assembly suitable for preparing a secondary battery having a structure that may increase a degree of freedom in the design of a device in which the secondary battery is installed, and a method of preparing a secondary battery.

16 Claims, 21 Drawing Sheets

(51) Int. Cl.
  *H01M 4/74* (2006.01)
  *H01M 10/052* (2010.01)
  *H01M 4/02* (2006.01)
  *H01M 10/0565* (2010.01)

(52) U.S. Cl.
  CPC .. *H01M 10/0565* (2013.01); *H01M 2004/025* (2013.01); *H01M 2220/30* (2013.01)

(56) References Cited

U.S. PATENT DOCUMENTS

| | | |
|---|---|---|
| 2003/0013012 A1 | 1/2003 | Ahn et al. |
| 2004/0127952 A1 | 7/2004 | O'Phelan et al. |
| 2005/0188533 A1 | 9/2005 | Righi et al. |
| 2006/0115718 A1 | 6/2006 | Parsian et al. |
| 2009/0123825 A1 | 5/2009 | O'Phelan et al. |
| 2009/0155678 A1 | 6/2009 | Less et al. |
| 2010/0203380 A1 | 8/2010 | O'Phelan et al. |
| 2011/0135996 A1 | 6/2011 | Ahn et al. |
| 2011/0274955 A1 | 11/2011 | Park et al. |
| 2012/0225345 A1 | 9/2012 | Kim |
| 2013/0011715 A1 | 1/2013 | Lee et al. |
| 2013/0209848 A1 | 8/2013 | Min et al. |
| 2013/0216880 A1 | 8/2013 | Park et al. |
| 2013/0288104 A1 | 10/2013 | Kang et al. |
| 2014/0106193 A1 | 4/2014 | Kim et al. |
| 2014/0134472 A1 | 5/2014 | Kim |
| 2014/0363725 A1 | 12/2014 | Park et al. |
| 2014/0363727 A1 | 12/2014 | Ko et al. |
| 2014/0370362 A1 | 12/2014 | Park et al. |
| 2015/0013151 A1 | 1/2015 | Kang et al. |
| 2015/0044536 A1 | 2/2015 | Kwon et al. |
| 2015/0072219 A1 | 3/2015 | Less et al. |
| 2015/0180082 A1 | 6/2015 | Jung et al. |

FOREIGN PATENT DOCUMENTS

| | | |
|---|---|---|
| CN | 101656094 A | 2/2010 |
| CN | 101828283 A | 9/2010 |
| CN | 102544577 A | 7/2012 |
| CN | 102884665 A | 1/2013 |
| CN | 102986079 A | 3/2013 |
| JP | 2000-030670 A | 1/2000 |
| JP | 2000-285881 A | 10/2000 |
| JP | 2000-311717 A | 11/2000 |
| JP | 2000-340265 A | 12/2000 |
| JP | 2001-357890 A | 12/2001 |
| JP | 2002-151159 A | 5/2002 |
| JP | 2003-523060 A | 7/2003 |
| JP | 2005-244234 A | 9/2005 |
| JP | 2006-73260 A | 3/2006 |
| JP | 2010-27368 A | 3/2006 |
| JP | 2006-512745 A | 4/2006 |
| JP | 2006-185662 A | 7/2006 |
| JP | 2007-18917 A | 1/2007 |
| JP | 2010-80324 A | 4/2010 |
| JP | 2011-54503 A | 3/2011 |
| JP | 2011-86506 A | 4/2011 |
| JP | 2011-113667 A | 6/2011 |
| JP | 2012-190588 A | 10/2012 |
| JP | 2013-524460 A | 6/2013 |
| JP | 2013-522844 A | 8/2013 |
| JP | 2014-531111 A | 11/2014 |
| JP | 2015-510679 A | 4/2015 |
| JP | 2015-526857 A | 9/2015 |
| JP | 2015-527709 A | 9/2015 |
| JP | 2015-531155 A | 10/2015 |
| JP | 2015-532766 A | 11/2015 |
| KR | 10-2003-0059930 A | 7/2003 |
| KR | 10-2008-0052869 A | 6/2008 |
| KR | 10-2013-0105272 A | 9/2013 |
| WO | WO 2004/097971 A1 | 11/2004 |

OTHER PUBLICATIONS

Extended European Search Report, dated Oct. 11, 2016, for European Application No. 14847498.4.

Partial European Search Report, dated Jul. 11, 2016, for European Application No. 14847498.4.

* cited by examiner

A1,A2

(a)

(b)

METHODS OF PREPARING ELECTRODE ASSEMBLY AND SECONDARY BATTERY

CROSS-REFERENCE TO RELATED APPLICATIONS

This application claims the priority of Korean Patent Application No. 10-2013-0114247 filed on Sep. 26, 2013, in the Korean Intellectual Property Office, and Korean Patent Application No. 10-2014-0108814 filed on Aug. 21, 2014, in the Korean Intellectual Property Office, the disclosure of which is incorporated herein by reference.

TECHNICAL FIELD

The present invention relates to methods of preparing an electrode assembly and a secondary battery, and more particularly, to a method of preparing an electrode assembly suitable for preparing a secondary battery having a structure that may increase a degree of freedom in the design of a device in which the secondary battery is installed, and a method of preparing a secondary battery.

BACKGROUND ART

In general, the demand for secondary batteries has been rapidly increased as technology development and demand with respect to mobile devices have increased. Among these secondary batteries, lithium (ion/polymer) secondary batteries having high energy density and operating voltage as well as excellent shelf and cycle life characteristics have been widely used as energy sources of various electronic products as well as various mobile devices.

Referring to Korean Patent Application Laid-Open Publication No. 2008-0052869, a structure of a general secondary battery is disclosed, and more particularly, a structure of a pouch-type secondary battery having a symmetric and approximately rectangular shape is disclosed.

Typically, in terms of the use of the space of a device in which a secondary battery is installed, the above secondary battery having a rectangular shape is advantageous. However, in a particular case, the secondary battery having a rectangular shape rather constrains the use of the space of a device. For example, smart phones are designed with an ultra thin profile for the ease of portability, and there are many cases that the total thickness thereof is less than 1 cm. Since a secondary battery and various electronic components as well as a camera module must be all installed in a limited internal space of the smart phone, the arrangement of these components are very important. However, since the camera module is capable of zooming in and out and includes a plurality of lenses, it is very difficult to reduce the thickness thereof. Also, since a high-capacity secondary battery is used for a prolonged operation of the smart phone, it is also very difficult to reduce the thickness of the secondary battery. Therefore, the camera module and the secondary battery are not disposed by being overlapped with each other, but must be disposed by being spaced apart from each other in the internal space of the smart phone.

Since the shape of the secondary battery is limited as described above, the installation position of each component is inevitably limited to a particular position, particularly in a small electronic device. As a result, the size and design of the device is considerably limited.

As a structure capable of addressing the above limitations, a perforated-type secondary battery has been developed in which a hole is formed in the center thereof. Secondary batteries are broadly categorized as a jelly-roll type; a stack and folding type, and a stacked type according to the shape of an electrode assembly, and the jelly-roll type and stack and folding type electrode assemblies are not suitable for preparing the perforated-type secondary battery.

Thus, only the stacked type electrode assembly, which is formed by separately stacking electrodes and separators, may be used in the perforated-type secondary battery. However, with respect to the stacked type electrode assembly, an excessively long period of time may be required for a process of aligning each layer by matching each hole formed in the plurality of electrodes and separators which constitute the electrode assembly. Even in the case in which the electrodes and separators are stacked by matching each hole formed in the plurality of electrodes and separators, a case frequently occurs in which the separators are deformed during a process of pressurizing or heating the electrodes and separators to change the position and shape of the hole. As a result, the perforated-type secondary battery is only at the level of idea and has not been commercialized yet.

SUMMARY OF THE INVENTION

The present invention provides a method of preparing an electrode assembly suitable for preparing a secondary battery having a structure that may increase a degree of freedom in the design of a device in which the secondary battery is installed, and a method of preparing a secondary battery.

According to an aspect of the present invention, there is provided a method of preparing an electrode assembly including the steps of: forming recessed portions recessed from edges of a first electrode and a second electrode toward inner sides thereof (S11); forming a unit structure having a four-layer structure, in which the first electrode, a first separator, the second electrode, a second separator are sequentially stacked, or a structure in which the four-layer structures are repeatedly stacked, or having the four-layer structure or a structure, in which the four-layer structures are repeatedly arranged, by stacking two kinds or more of radical units, in which the first electrode, the first separator, the second electrode, and the second separator are alternatingly disposed and integrally combined, one by one in a predetermined sequence (S20); forming recessed portions in the first separator and the second separator by cutting regions of the first separator and the second separator included in the unit structure corresponding to the recessed portions with a margin (S31); and forming an electrode assembly by stacking the plurality of unit structures to allow the recessed portions of the adjacent unit structures to face each other (S41).

According to another aspect of the present invention, there is provided a method of preparing an electrode assembly including the steps of: forming through holes at inner sides of a first electrode and a second electrode (S12); forming a unit structure having a four-layer structure, in which the first electrode, a first separator, the second electrode, a second separator are sequentially stacked, or a structure in which the four-layer structures are repeatedly stacked, or having the four-layer structure or a structure, in which the four-layer structures are repeatedly arranged, by stacking two kinds or more of radical units, in which the first electrode, the first separator, the second electrode, and the second separator are alternatingly disposed and integrally combined, one by one in a predetermined sequence (S20); forming through holes in the first separator and the second separator by cutting regions of the first separator and the second separator included in the unit structure corresponding to the through holes with a margin (S32); and forming an electrode assembly by stacking the plurality of unit structures to allow the through holes of the adjacent unit structures to face each another (S42).

According to another aspect of the present invention, there is provided a method of preparing a lithium secondary battery including the steps of: forming recessed portions recessed from edges of a first electrode and a second electrode toward inner sides thereof (S11); forming a unit structure having a four-layer structure, in which the first electrode; a first separator, the second electrode, a second separator are sequentially stacked, or a structure in which the four-layer structures are repeatedly stacked, or having the four-layer structure or a structure, in which the four-layer structures are repeatedly arranged, by stacking two kinds or more of radical units, in which the first electrode, the first separator, the second electrode, and the second separator are alternatingly disposed and integrally combined, one by one in a predetermined sequence (S20); forming recessed portions in the first separator and the second separator by cutting regions of the first separator and the second separator included in the unit structure corresponding to the recessed portions with a margin (S31); forming an electrode assembly by stacking the plurality of unit structures to allow the recessed portions of the adjacent unit structures to face each another (S41); and accommodating the electrode assembly in a pouch case and forming regions of the pouch case other than a vertical projection plane of the electrode assembly as fused portions (S50).

According to another aspect of the present invention, there is provided a method of preparing a lithium secondary battery including the steps of: forming through holes at inner sides of a first electrode and a second electrode (S12); forming a unit structure having a four-layer structure, in which the first electrode, a first separator, the second electrode, a second separator are sequentially stacked, or a structure in which the four-layer structures are repeatedly stacked, or having the four-layer structure or a structure, in which the four-layer structures are repeatedly arranged, by stacking two kinds or more of radical units, in which the first electrode, the first separator, the second electrode, and the second separator are alternatingly disposed and integrally combined, one by one in a predetermined sequence (S20); forming through holes in the first separator and the second separator by cutting regions of the first separator and the second separator included in the unit structure corresponding to the through holes with a margin (S32); forming an electrode assembly by stacking the plurality of unit structures to allow the through holes of the adjacent unit structures to face each another (S42), and accommodating the electrode assembly in a pouch case and forming regions of the pouch case other than a vertical projection plane of the electrode assembly as fused portions (S50).

According to the present invention, a method of preparing an electrode assembly suitable for preparing a secondary battery having a structure that may increase a degree of freedom in the design of a device in which the secondary battery is installed, and a method of preparing a secondary battery may be provided.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

DETAILED DESCRIPTION OF THE INVENTION

Figure 1:
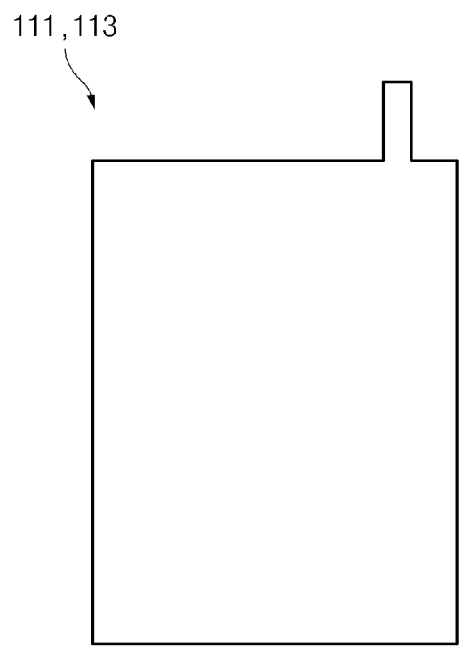
FIG. 1 is a plan view of electrodes.

Hereinafter, preferred embodiments of the present invention will be described in detail with reference to the accompanying drawings. The present invention may, however, should not be construed as being limited to the embodiments set forth herein.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

In the drawings, the size of each element or specific parts constituting the element is exaggerated, omitted, or schematically illustrated for convenience in description and clarity. Thus, the size of each element does not entirely reflect an actual size. Moreover, detailed descriptions related to well-known functions or configurations will be ruled out in order not to unnecessarily obscure subject matters of the present invention.

A method of preparing an electrode assembly according to a first exemplary embodiment of the present invention includes the steps of: forming recessed portions A1 recessed from edges of a first electrode 111 and a second electrode 113 toward inner sides thereof (S11); forming a unit structure 110 having a four-layer structure, in which the first electrode 111, a first separator 112, the second electrode 113, a second separator 114 are sequentially stacked, or a structure in which the four-layer structures are repeatedly stacked, or having the four-layer structure or a structure, in which the four-layer structures are repeatedly arranged, by stacking two kinds or more of radical units, in which the first electrode 111, the first separator 112, the second electrode 113, and the second separator 114 are alternatingly disposed and integrally combined, one by one in a predetermined sequence (S20); forming recessed portions A2 in the first separator 112 and the second separator 114 by cutting regions of the first separator 112 and the second separator 114 included in the unit structure 110 corresponding to the recessed portions A1 with a margin (S31); and forming an electrode assembly 100 by stacking the plurality of unit structures 110 to allow the recessed portions A1 and A2 of the adjacent unit structures 110 to face each another (S41).

Figure 2:
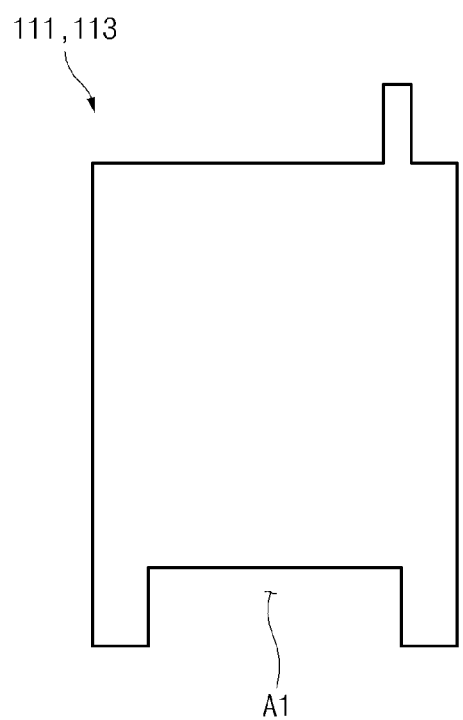
FIG. 2 is a plan view of electrodes in which recessed portions according to a first embodiment are formed.

First, in order to perform step S11, the electrodes 111 and 113 illustrated in FIG. 1 are prepared, and as illustrated in FIG. 2, the recessed portion A1 may be formed from the edge of one side of the first electrode 11 or the second electrode 113 toward the inner side thereof. The formation of the recessed portions A1 may be completed by cutting the electrodes 111 and 113 illustrated in FIG. 1, but the electrodes 111 and 113 having the recessed portion A1 initially formed therein may be prepared.

Figure 3:
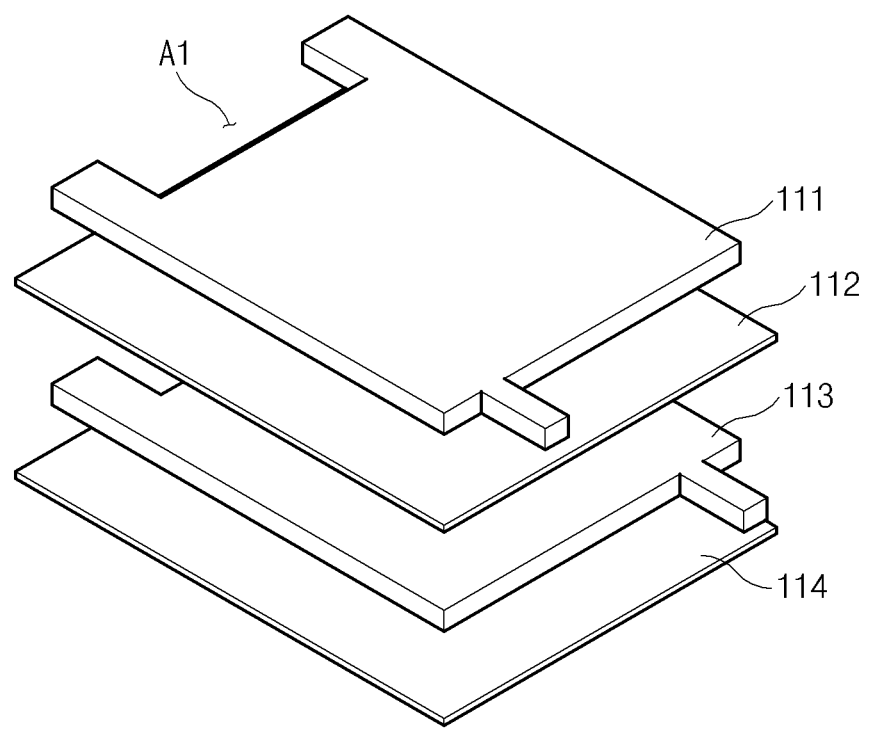
FIG. 3 is an exploded perspective view of a unit structure according to the first embodiment including the electrodes, in which the recessed portions are formed, and separators in which recessed portions are not formed.
Figure 4:
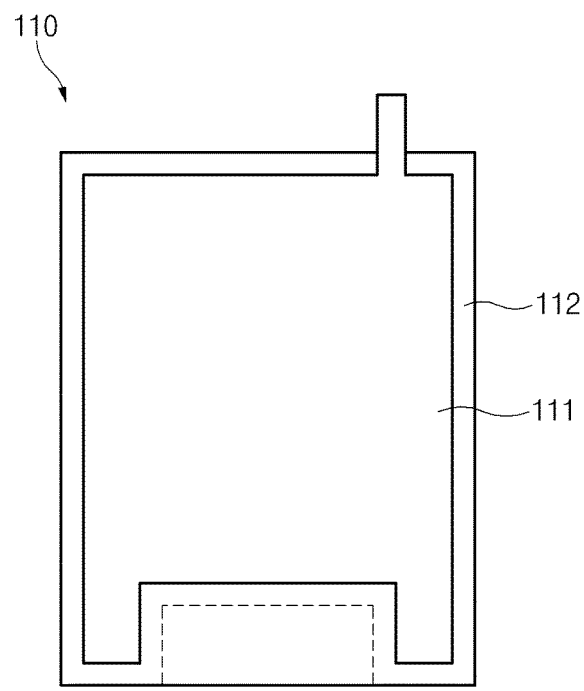
FIG. 4 is a plan view of the unit structure according to the first embodiment including the electrodes, in which the recessed portions are formed, and separators in which recessed portions are not formed.

Next, as illustrated in FIGS. 3 and 4, step S20 of forming the unit structure 110 is performed by stacking the first electrode 111 and the second electrode 113 having the recessed portion A1 formed therein and the first separator 112 and the second separator 114 not having a recessed portion in the sequence of the first electrode 111, the first separator 112, the second electrode 113, the second separator 114. The unit structure 110 including the plurality of stack structures may be introduced, and the unit structure 110 may further include an auxiliary unit to be described later.

Figure 5:
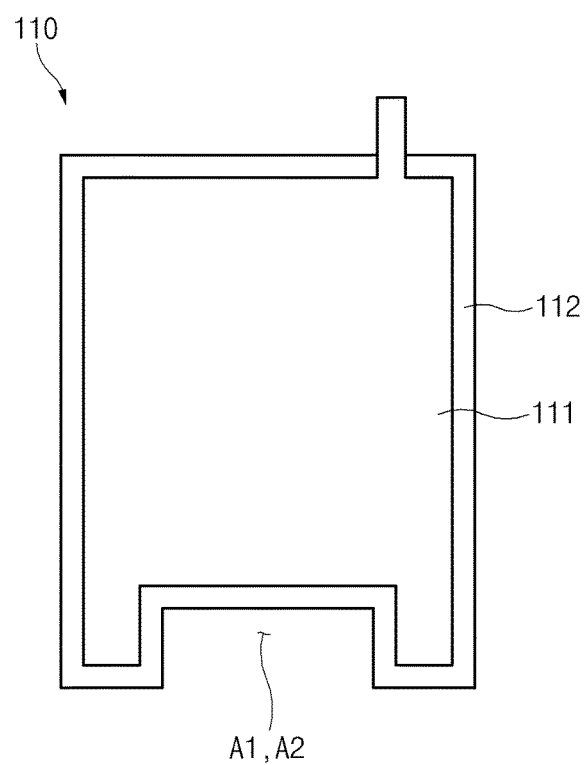
FIG. 5 is a plan view of a unit structure according to the first embodiment in which recessed portions are formed in separators.
Figure 6:
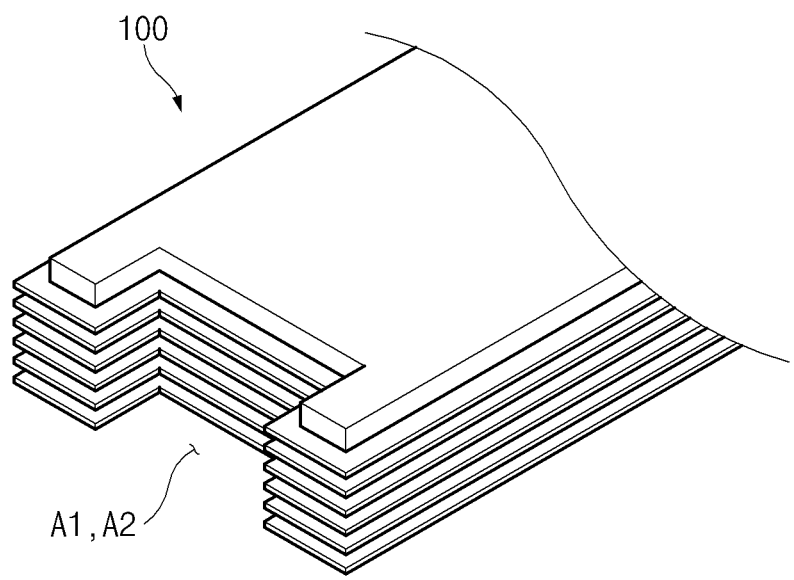
FIG. 6 is a perspective view of an electrode assembly according to the first embodiment in which the plurality of unit structures of FIG. 5 are stacked.

Next, as illustrated in FIGS. 5 and 6, step S31 of forming the recessed portions A2 in the first separator 112 and the second separator 114 is performed by cutting the regions, which face the recessed portions A1 formed in the electrodes 111 and 113, among entire regions of the first separator 112 and the second separator 114. The separators 112 and 114 are cut to have an area slightly larger than the electrodes 111 and 113 so as to prevent the electrodes 111 and 113 disposed on both sides of each of the separators 112 and 114 from being short-circuited without passing the separators 112 and 114. For the same reason, it is also desirable to cut the separators 112 and 114 along a dotted line of FIG. 4 with some margin from an outline defining the recessed portions A1 formed in the electrodes 111 and 113 when forming the recessed portions A2 in the separators 112 and 114.

Next, as illustrated in FIG. 6, step S41 of forming the electrode assembly 100 is performed by stacking the unit structures 110 to allow the recessed portions A1 and A2 of the adjacent unit structures 110 to face each another.

The recessed portions A1 and A2 formed in any one of the unit structures 110 may have the same size as that of the recessed portions A1 and A2 formed in the adjacent unit structure 110. However, in order for a secondary battery to have the maximum capacitance without interfering with components installed in a mechanical or electronic device, the recessed portions A1 and A2 formed in any one of the unit structures 110 may have a different size from that of the recessed portions A1 and A2 formed in the adjacent unit structure 110.

Figure 7:
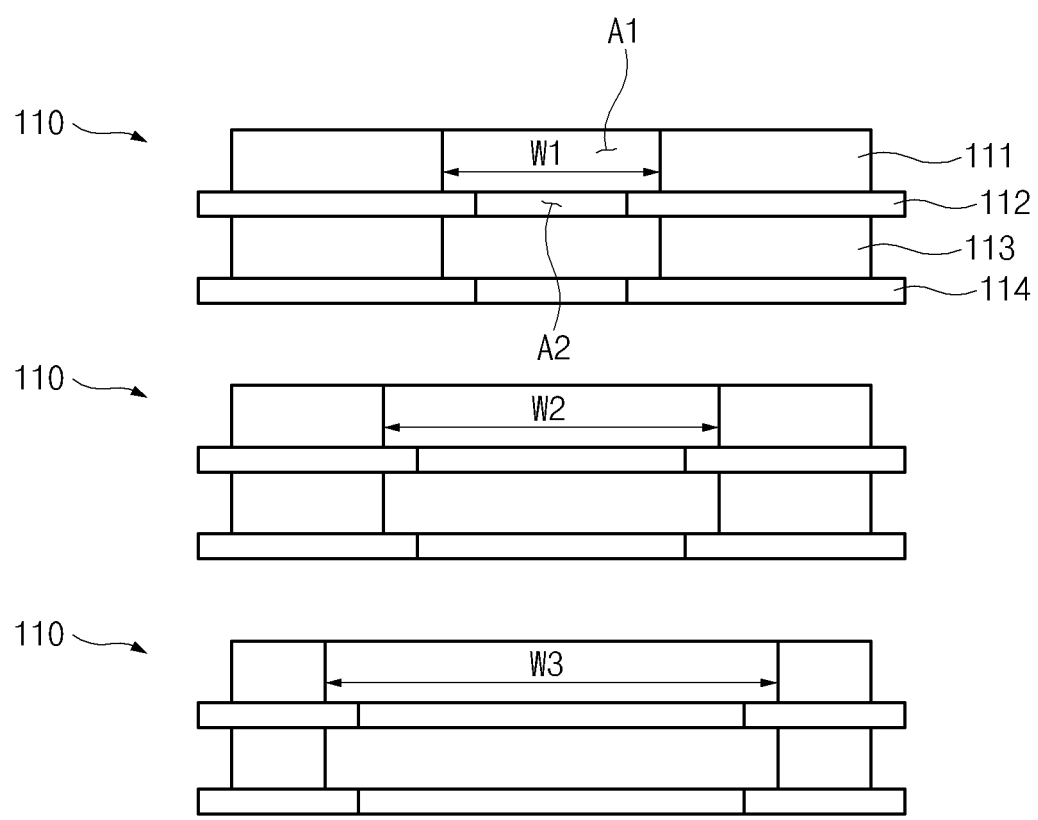
FIG. 7, as an exploded view of an electrode assembly according to a modified embodiment of the first embodiment in which a plurality of unit structures is stacked, is a side view taken from the side of a recessed portion of the electrode assembly.

For example, referring to FIG. 7 as a modified embodiment of the first embodiment, it may be confirmed that a width W1 of the recessed portions A1 formed in the electrodes 111 and 113 of the unit structure 110 disposed at the uppermost side of the electrode assembly 100 is the smallest, a width W2 of the recessed portions A1 formed in the electrodes 111 and 113 of the unit structure 110 disposed in the middle of the electrode assembly 100 is the next smallest, and a width W3 of the recessed portions A1 formed in the electrodes 111 and 113 of the unit structure 110 disposed at the lowermost side of the electrode assembly 100 is the largest.

The size of the recessed portions A1 formed in the electrodes 111 and 113 may gradually increase or, on the contrary, may gradually decrease from a top surface of the electrode assembly 100 to a bottom surface thereof. Also, the size of the recessed portions A2 formed in the separators 112 and 114 may gradually increase or, on the contrary, may gradually decrease from the top surface of the electrode assembly 100 to the bottom surface thereof.

Hereinafter, a method of preparing an electrode assembly according to a second exemplary embodiment of the present invention will be described.

The method of preparing an electrode assembly according to the second exemplary embodiment of the present invention includes the steps of: forming through holes B1 at inner sides of a first electrode 111 and a second electrode 113 (S12); forming a unit structure 110 having a four-layer structure, in which the first electrode 111, a first separator 112, the second electrode 113, a second separator 114 are sequentially stacked, or a structure in which the four-layer structures are repeatedly stacked, or having the four-layer structure or a structure, in which the four-layer structures are repeatedly arranged, by stacking two kinds or more of radical units, in which the first electrode 111, the first separator 112, the second electrode 113, and the second separator 114 are alternatingly disposed and integrally combined, one by one in a predetermined sequence (S20); forming through holes B2 in the first separator 112 and the second separator 114 by cutting regions of the first separator 112 and the second separator 114 included in the unit structure 110 corresponding to the through holes B1 with a margin (S32); and forming an electrode assembly 100 by stacking the plurality of unit structures 110 to allow the through holes B1 and B2 of the adjacent unit structures 110 to face each another (S42).

Figure 8:
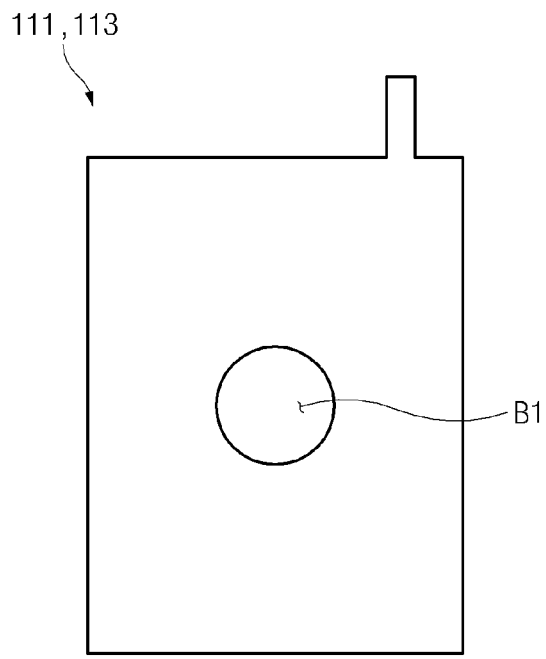
FIG. 8 is a plan view of electrodes, in which through holes are formed, according to a second embodiment.

First, in order to perform step S12, the electrodes 111 and 113 illustrated in FIG. 1 are prepared, and as illustrated in FIG. 8, the through holes B1 may be formed at the inner sides of the first electrode 111 and the second electrode 113. The shape of the through holes B1 is not limited to a circular shape, but the through holes B1 may be formed in a polygonal or irregular shape. Also, the plurality of through holes B1 may be formed in the electrodes 111 and 113. The formation of the through holes B1 may be achieved by cutting the electrodes 111 and 113 illustrated in FIG. 1, but the electrodes 111 and 113 having the through hole B1 initially formed therein may be prepared.

Figure 9:
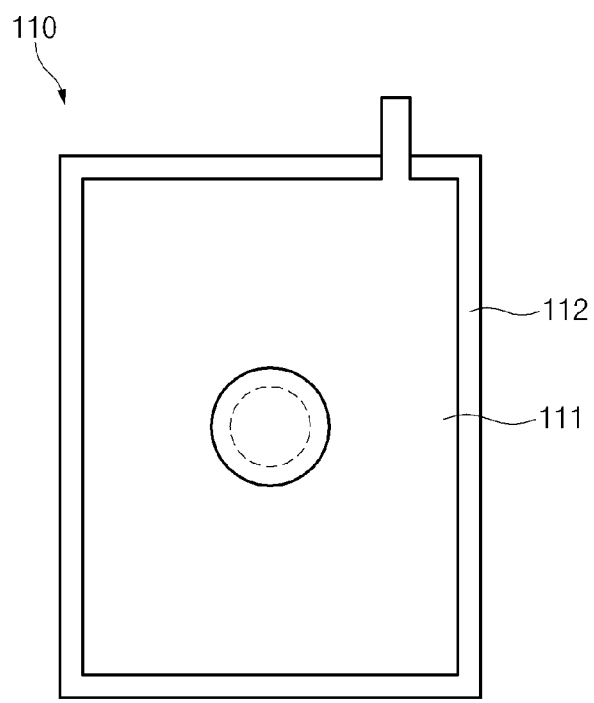
FIG. 9 is a plan view of a unit structure according to the second embodiment including the electrodes, in which the through holes are formed, and separators in which through holes are not formed.

Next, as illustrated in FIG. 9, step S20 of forming the unit structure 110 is performed by stacking the first electrode 111 and the second electrode 113 having the through hole B1 formed therein and the first separator 112 and the second separator 114 not having a through hole in the sequence of the first electrode 111, the first separator 112, the second electrode 113, the second separator 114. The unit structure 110 including the plurality of stack structures may be introduced, and the unit structure 110 may further include an auxiliary unit to be described later. Although FIG. 3 illustrates the first embodiment, the structure of the unit structure 110 according to the second embodiment may be easily identified when referring to FIGS. 3 and 9 because each layer included in the unit structure 110 according to the second embodiment is also stacked in the same manner as in FIG. 3.

Figure 10:
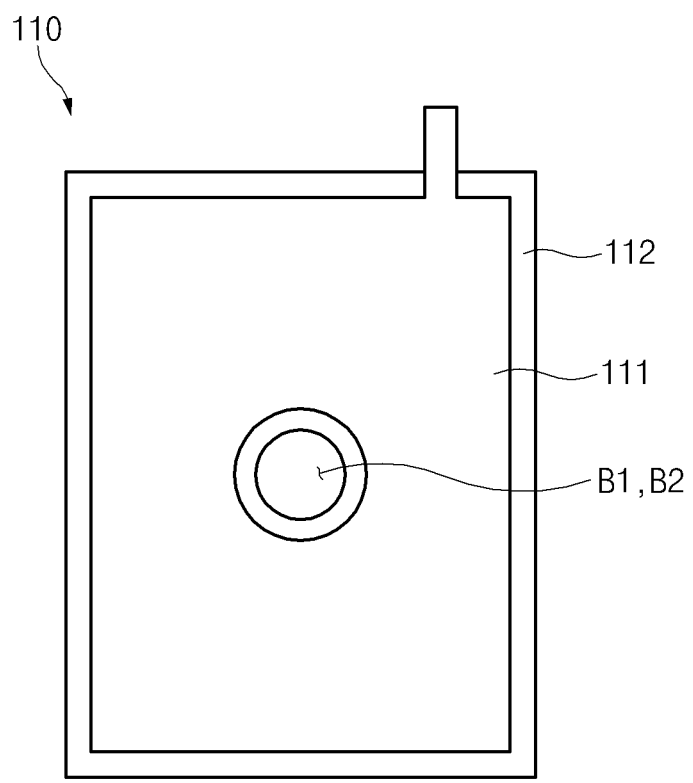
FIG. 10 is a plan view of a unit structure according to the second embodiment in which through holes are formed in separators.
Figure 11:
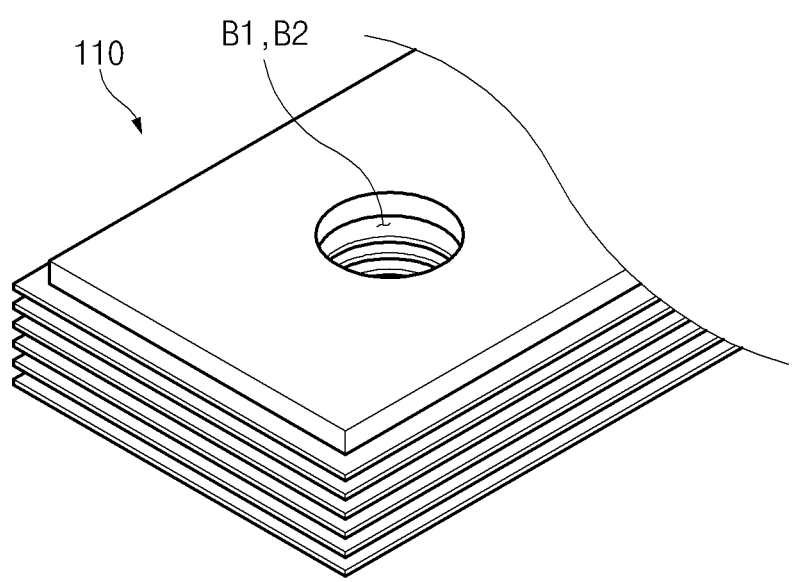
FIG. 11 is a perspective view of an electrode assembly according to the second embodiment in which the plurality of unit structures of FIG. 10 are stacked.

Next, as illustrated in FIGS. 10 and 11, step S32 of forming the through holes B2 in the first separator 112 and the second separator 114 is performed by cutting the regions, which face the through holes B1 formed in the electrodes 111 and 113, among entire regions of the first separator 112 and the second separator 114. The separators 112 and 114 are cut to have an area slightly larger than the electrodes 111 and 113 so as to prevent the electrodes 111 and 113 disposed on both surfaces of each of the separators 112 and 114 from being short-circuited without passing the separators 112 and 114. For the same reason, it is also desirable to cut inner regions of the separators 112 and 114 defined by a dotted line of FIG. 9 along the dotted line with some margin from an outline defining the through holes B1 formed in the electrodes 111 and 113 when forming the through holes B2 in the separators 112 and 114.

Next, as illustrated in FIG. 11, step S42 of forming the electrode assembly 100 is performed by stacking the unit structures 110 to allow the through holes B1 and B2 of the adjacent unit structures 110 to face each another.

Similar to the first embodiment, in the second embodiment, the through holes B1 and B2 formed any one of the unit structures 110 may have the same size or a different size from that of the through holes B1 and B2 formed in the adjacent unit structure 110.

Figure 12:
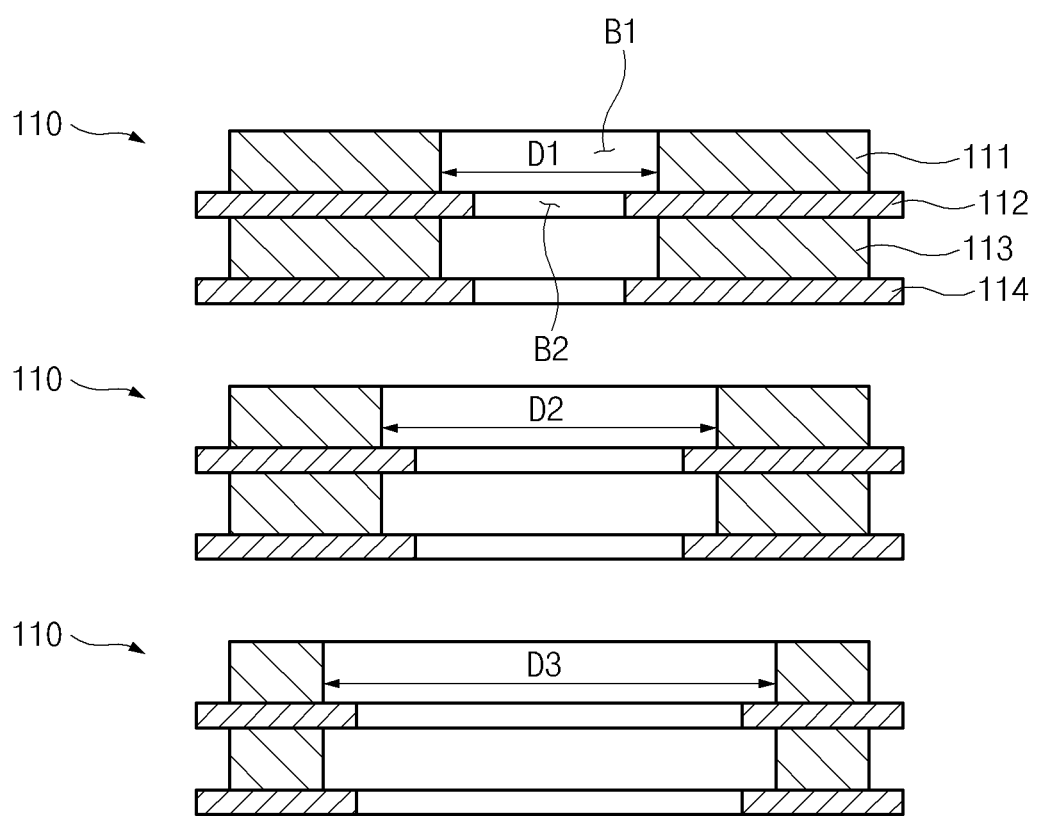
FIG. 12, as an exploded view of an electrode assembly according to a modified embodiment of the second embodiment in which a plurality of unit structures is stacked, is a vertical cross-sectional view taken through through hole portions of the electrode assembly.

For example, referring to FIG. 12 as a modified embodiment of the second embodiment, it may be confirmed that a width D1 of the through holes B1 formed in the electrodes 111 and 113 of the unit structure 110 disposed at the uppermost side of the electrode assembly 100 is the smallest, a width D2 of the through holes B1 formed in the electrodes 111 and 113 of the unit structure 110 disposed in the middle of the electrode assembly 100 is the next smallest, and a width D3 of the through holes B1 formed in the electrodes 111 and 113 of the unit structure 110 disposed at the lowermost side of the electrode assembly 100 is the largest.

The size of the through holes B1 formed in the electrodes 111 and 113 may gradually increase or, on the contrary, may gradually decrease from a top surface of the electrode assembly 100 to a bottom surface thereof. Also, the size of the through holes B2 formed in the separators 112 and 114 may gradually increase or, on the contrary, may gradually decrease from the top surface of the electrode assembly 100 to the bottom surface thereof.

Hereinafter, a method preparing a secondary battery according to the first embodiment including the electrode assembly 100 according to the first embodiment will be described.

Figure 13:
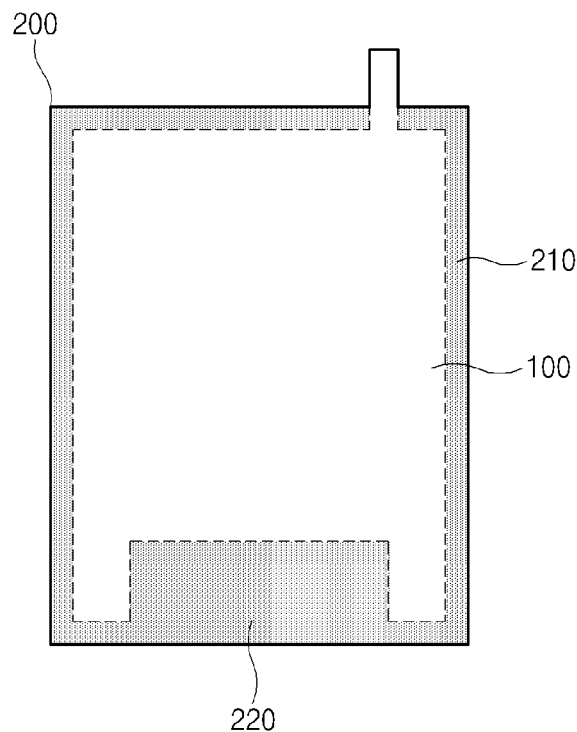
FIG. 13, as a plan view of a secondary battery according to the first embodiment, illustrates a state in which a fused portion corresponding to the recessed portion is not cut off.
Figure 14:
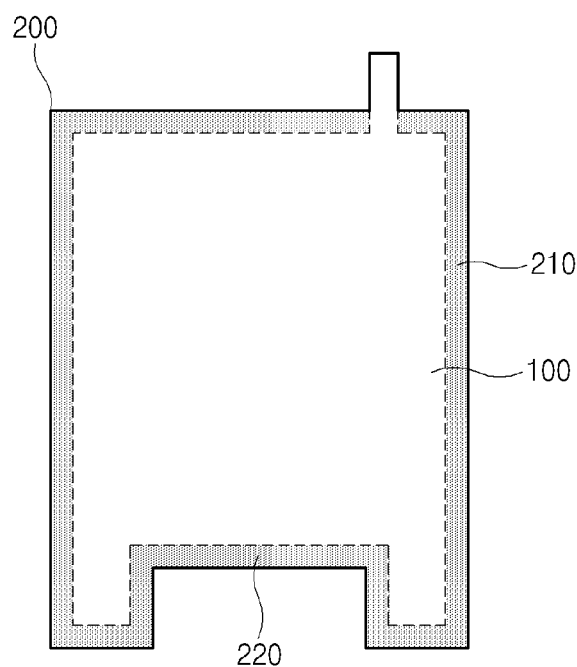
FIG. 14 illustrates a state in which the fused portion corresponding to the recessed portion is cut off from the secondary battery of FIG. 13.

In the method of preparing a secondary battery according to the first embodiment, step S50 of accommodating the electrode assembly 100 prepared through step S11, step S20, step S31, and step S41 in a pouch case 200 and forming regions of the pouch case 200 other than a vertical projection plane of the electrode assembly 100 as fused portions 210 and 220 is further performed (see FIGS. 13 and 14).

That is, the method of preparing a secondary battery according to the first embodiment includes the steps of: forming recessed portions A1 recessed from edges of a first electrode 111 and a second electrode 113 toward inner sides thereof (S11); forming a unit structure 110 having a four-layer structure, in which the first electrode 111, a first separator 112, the second electrode 113, a second separator 114 are sequentially stacked, or a structure in which the four-layer structures are repeatedly stacked, or having the four-layer structure or a structure, in which the four-layer structures are repeatedly arranged, by stacking two kinds or more of radical units, in which the first electrode 111, the first separator 112, the second electrode 113, and the second separator 114 are alternatingly disposed and integrally combined, one by one in a predetermined sequence (S20); forming recessed portions A2 in the first separator 112 and the second separator 114 by cutting regions of the first separator 112 and the second separator 114 included in the unit structure 110 corresponding to the recessed portions A1 with a margin (S31); forming an electrode assembly 100 by stacking the plurality of unit structures 110 to allow the recessed portions A1 and A2 of the adjacent unit structures 110 to face each another (S41); and accommodating the electrode assembly 100 in the pouch case 200 and forming regions of the pouch case 200 other than the vertical projection plane of the electrode assembly 100 as the fused portions 210 and 220 (S50).

Descriptions overlapping with those of step S11, step S20, step S31, and step 41 will be omitted, and step S50 will be described.

In step S50, the expression "vertical projection plane of the electrode assembly 100" denotes regions of the top surface and the bottom surface of the pouch case 200 which overlap the electrode assembly 100. Thus, the expression "regions of the pouch case 200 other than the vertical projection plane of the electrode assembly 100" denotes regions indicated by hatching in FIG. 13. Eventually, the forming of the regions other than the vertical projection plane of the electrode assembly 100 as the fused portions 210 and 220 denotes the fusing of the regions indicated by hatching in FIG. 13.

As described above, the formation of the recessed portions A1 and A2 in the electrode assembly 100 is for the purpose of increasing a degree of freedom in the design of a mechanical or electronic device, and, in order to sufficiently achieve the purpose, it is desirable to make the shapes of the electrode assembly 100 and the pouch case 200 approximately the same.

Thus, step S50 may include a process of cutting a smaller area than the recessed portions A2 of the first separator 112 and the second separator 114 out of the region 220 of the fused portions 210 and 220 corresponding to the recessed portions A1 and A2, and the secondary battery at the completion of the process is illustrated in FIG. 14.

Hereinafter, a method of preparing a secondary battery according to the second embodiment including the electrode assembly 100 according to the second embodiment will be described.

Figure 15:
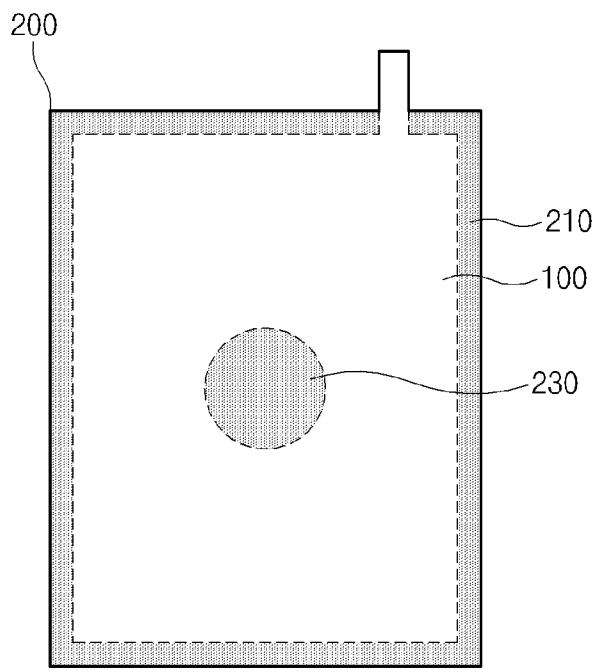
FIG. 15, as a plan view of a secondary battery according to the second embodiment, illustrates a state in which a fused portion corresponding to the through hole is not cut off.
Figure 16:
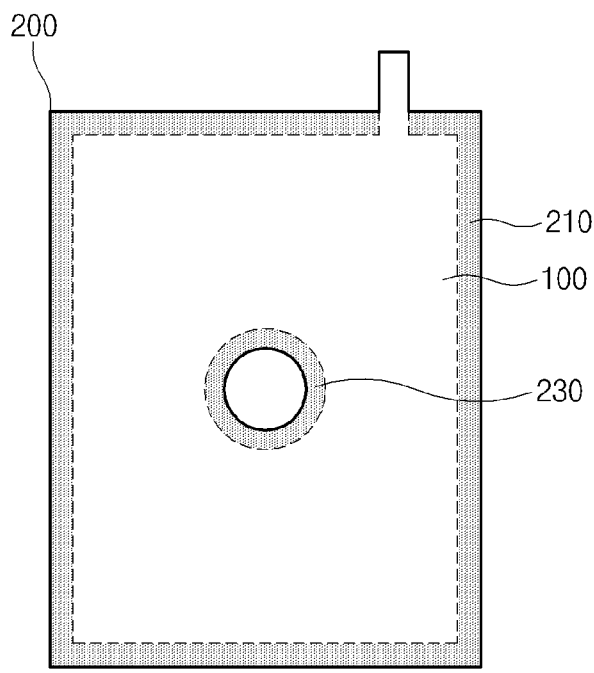
FIG. 16 illustrates a state in which the fused portion corresponding to the through hole is cut off from the secondary battery of FIG. 15.

In the method of preparing a secondary battery according to the second embodiment, step S50 of accommodating the electrode assembly 100 prepared through step S12, step S20, step S32, and step S42 in a pouch case 200 and forming regions of the pouch case 200 other than a vertical projection plane of the electrode assembly 100 as fused portions 210 and 230 is further performed (see FIGS. 15 and 16).

That is, the method of preparing a secondary battery according to the second embodiment includes the steps of: forming through holes B1 at inner sides of a first electrode 111 and a second electrode 113 (S12); forming a unit structure 110 having a four-layer structure, in which the first electrode 111, a first separator 112, the second electrode 113, a second separator 114 are sequentially stacked, or a structure in which the four-layer structures are repeatedly stacked, or having the four-layer structure or a structure, in which the four-layer structures are repeatedly arranged, by stacking two kinds or more of radical units, in which the first electrode 111, the first separator 112, the second electrode 113, and the second separator 114 are alternatingly disposed and integrally combined, one by one in a predetermined sequence (S20); forming through holes B2 in the first separator 112 and the second separator 114 by cutting regions of the first separator 112 and the second separator 114 included in the unit structure 110 corresponding to the through holes B1 with a margin (S32); forming an electrode assembly 100 by stacking the plurality of unit structures 110 to allow the through holes B1 and B2 of the adjacent unit structures 110 to face each another (S42); and accommodating the electrode assembly 100 in the pouch case 200 and forming regions of the pouch case 200 other than the vertical projection plane of the electrode assembly 100 as the fused portions 210 and 230 (S50).

Descriptions overlapping with those of step S12, step S20, step S32, and step 42 will be omitted, and step S50 will be described.

In step S50 of the second embodiment, the expression "vertical projection plane of the electrode assembly 100" is used in the same meaning as that of the first embodiment, and thus, the forming of the regions other than the vertical projection plane of the electrode assembly 100 as the fused portions 210 and 230 denotes the fusing of the regions indicated by hatching in FIG. 15.

Also, step S50 may include a process of cutting a smaller area than the through holes B2 of the first separator 112 and the second separator 114 out of the region 230 of the fused portions 210 and 230 corresponding to the through holes B1 and B2, and the secondary battery at the completion of the process is illustrated in FIG. 16.

Regardless of the first embodiment and the second embodiment, the process of cutting the fused portions 210, 220, and 230 in step S50 may be performed by laser cutting, ultrasonic cutting, and die cutting.

Until now, the structure of the unit structure 110 only including a structure, in which each layer is simply stacked in the sequence of the first electrode 111, the first separator 112, the second electrode 113, the second separator 114, has been briefly described. Also, detailed process of forming the single unit structure 110 by fixing relative positions of different layers constituting the unit structure 110 or forming the electrode assembly 100 including the unit structure 110 has not been described in detail.

Thus, what process is actually used to prepare the unit structure 110 or the structures of various electrode assemblies 100 that may be used in the present invention will be described below.

Figure 17:
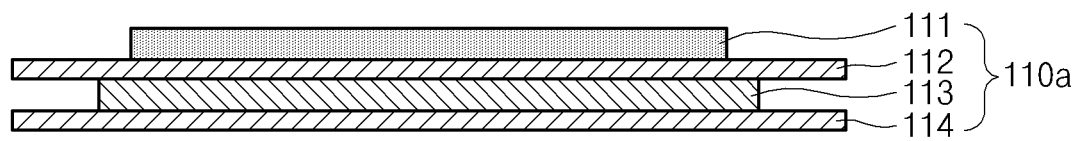
FIG. 17 is a side view illustrating a first structure of a unit structure included in an electrode assembly that is prepared by a method of preparing an electrode assembly according to the present invention.
Figure 18:
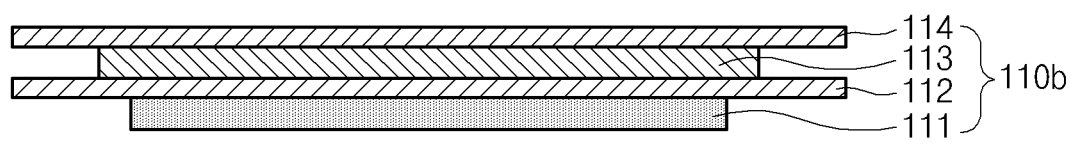
FIG. 18 is side view illustrating a second structure of a unit structure included in an electrode assembly that is prepared by a method of preparing an electrode assembly according to the present invention.

The electrode assembly 100 prepared by the method of preparing an electrode assembly according to the present invention includes at least one of unit structures 110a and 110b (see FIGS. 17 and 18).

In the electrode assembly according to the present invention, the radical unit is formed by alternatingly arranging the electrodes and the separators. In this case, the same number of electrodes and separators are arranged. For example, the radical unit 110a may be formed by stacking the two electrodes 111 and 113, and the two separators 112 and 114. In this case, the cathode and the anode may, of course, face each other through the separator. When the radical unit is formed like this, the electrode is disposed at one side end of the radical unit and the separator is disposed at the other side end of the radical unit.

The electrode assembly according to the present invention has basic features in that the unit structure (i.e., electrode assembly) may be formed only by stacking the radical units. That is, the present invention has basic features in that the unit structure may be formed by repeatedly stacking one kind of the radical units or stacking two kinds or more of the radical units in a predetermined sequence. In order to realize such features, the radical unit may have the following structure.

First, the radical unit may be formed by sequentially stacking the first electrode, the first separator, the second electrode, and the second separator. Specifically, the radical units 110a and 110b may be formed by sequentially stacking the first electrode 111, the first separator 112, the second electrode 113, and the second separator 114 from a top side to a bottom side thereof, or may be formed by sequentially stacking the first electrode 111, the first separator 112, the second electrode 113, and the second separator 114 from the bottom side to the top side. Hereinafter, the radical unit having the above structure is referred to as "first radical unit". In this case, the first electrode 111 and the second electrode 113 are electrodes having opposite polarities. For example, when the first electrode 111 is a cathode, the second electrode 113 is an anode.

When the radical unit is formed by sequentially stacking the first electrode 111, the first separator 112, the second electrode 113, and the second separator 114 as described above, a unit structure 100a may be formed only by repeatedly stacking one kind of the radical units 110a. Herein, the radical unit may have an eight-layer structure or twelve-layer structure in addition to the above four-layer structure. That is, the radical unit may have a structure in which the four-layer structures are repeatedly arranged. For example, the radical unit may also be formed by sequentially stacking the first electrode, the first separator, the second electrode, the second separator, the first electrode, the first separator, the second electrode, and the second separator.

Second, the radical unit may be formed by sequentially stacking the first electrode, the first separator, the second electrode, the second separator, the first electrode, and the first separator, or may be formed by sequentially stacking the second electrode, the second separator, the first electrode, the first separator, the second electrode, and the second separator. Hereinafter, the radical unit having the former structure is referred to as "second radical unit", and the radical unit having the latter structure is referred to as "third radical unit".

Specifically, the second radical unit 110c may be formed by sequentially stacking the first electrode 111, the first separator 112, the second electrode 113, the second separator 114, the first electrode 111, and the first separator 112 from a top side to a bottom side thereof. Also, the third radical unit 110d may be formed by sequentially stacking the second electrode 113, the second separator 114, the first electrode 111, the first separator 112, the second electrode 113, and the second separator 114 from a top side to a bottom side thereof. Conversely, the second and third radical units may be also formed by sequentially stacking from the bottom side to the top side.

When each one of the second radical unit and the third radical unit is stacked, a structure is formed in which the four-layer structures are repeatedly stacked. Thus, when each one of the second radical unit and the third radical unit is alternatingly and continuously stacked, a unit structure may be formed only by stacking the second and third radical units as illustrated in FIG. 6.

Thus, in the present invention, one kind of the radical unit may have a four-layer structure in which the first electrode, the first separator, the second electrode, and the second separator are sequentially disposed, or a structure in which the four-layer structures are repeatedly arranged. Also, in the preset invention, when two kinds or more of the radical units are arranged one by one in a predetermined sequence, a four-layer structure or a structure, in which the four-layer structures are repeatedly arranged, is formed. For example, the above-described first radical unit has a four-layer structure, and when each one of the above-described second radical unit and third radical unit is stacked, i.e., total two radical units are stacked, a twelve-layer structure is formed in which the four-layer structures are repeatedly stacked.

Thus, in the present invention, when one kind of the radical units are repeatedly stacked or two kinds or more of the radical units are stacked in a predetermined sequence, a unit structure (i.e., electrode assembly) may be formed only by the stacking.

In the present invention, the unit structure is formed by stacking the radical unit as a basic unit. That is, radical units are first prepared and a unit structure is then prepared by repeatedly stacking the radical units or stacking the radical units in a predetermined sequence. Thus, in the present invention, the unit structure may be formed only by stacking the radical units. Therefore, in the present invention, the radical units may be very precisely aligned. When the radical units are precisely aligned, the electrodes and the separators may also be precisely aligned in the unit structure. Also, since the process becomes very simple, the present invention may significantly improve productivity of the unit structure (electrode assembly).

The first electrode 111 included in the unit structure 110 includes a current collector and an active material layer (active material), and both sides of the current collector are coated with the active material layer. Similarly, the second electrode 113 included in the unit structure 110 also includes a current collector and an active material layer (active material), and both sides of the current collector are coated with the active material layer.

Figure 19:
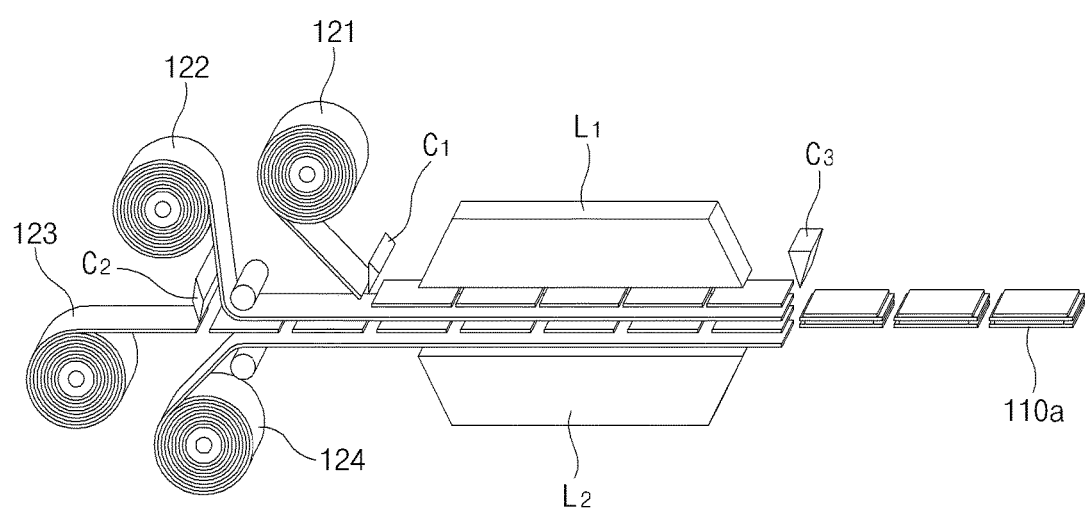
FIG. 19 is a process diagram illustrating a process f preparing a unit structure according to the present invention.

The process of preparing the unit structure 110 may be performed by the following continuous process (see FIG. 19). First, a first electrode material 121, a first separator material 122, a second electrode material 123, and a second separator material 124 are prepared. Herein, the electrode materials 121 and 123 form the electrodes 111 and 113 by cutting to a predetermined size as described below. The same process is also applied to the separator materials 122 and 124. The electrode materials 121 and 123 and the separator materials 122 and 124 may have a form of being wound on a roll for the process automation. These materials are prepared as described above, and the first electrode material 121 is cut to a predetermined size by a cutter $C_1$. The second electrode material 123 is also cut to a predetermined size by a cutter $C_2$. Then, the first electrode material 121 having a predetermined size is provided on the first separator material 122 and the second electrode material 123 having a predetermined size is also provided on the second separator material 124. Thereafter, these materials are supplied together to laminators $L_1$ and $L_2$.

As described above, the electrode assembly 100 is formed by repeatedly stacking the unit structures 110. However, if the electrodes and the separators constituting the unit structures 110 are separated from each other, it may be very difficult to repeatedly stack the unit structures 110. Thus, it is desirable that the electrodes and the separators included in the unit structures 110 are bonded to one other, and the laminators $L_1$ and $L_2$ are used to bond the electrodes and the separators to one another. That is, the laminators $L_1$ and $L_2$ apply pressure or heat and pressure to the materials to bond the electrode materials and the separator materials to one another. Thus, the electrode materials and the separator materials are bonded to one another through a lamination process by using the laminators $L_1$ and $L_2$, and, as a result of the bonding, the unit structures 110 may more stably maintain their shape.

After the lamination of each layer, the first separator material 122 and the second separator material 124 are cut to a predetermined size by a cutter $C_3$. The unit structure 110 may be formed by the cutting. In addition, various tests may be performed on the unit structure 110 if necessary. For example, tests, such as thickness test, vision test, and short-circuit test, may be further performed.

The process of preparing the unit structure 110 may be performed by the above-described continuous process, but the process of preparing the unit structure 110 is not necessarily performed by the continuous process. That is, it is also possible that the first electrode 111, the first separator 112, the second electrode 113, and the second separator 114 are first cut to an appropriate size, and the unit structure 110 is then formed by stacking them.

Surfaces of the separators 112 and 114 or the separator materials 122 and 124 may be coated with a coating material having adhesiveness. In this case, the coating material may be a mixture of inorganic material particles and a binder polymer. Herein, the inorganic material particles may improve thermal stability. That is, the inorganic material particles may prevent the shrinkage of the separator at high temperature. The binder polymer may fix the inorganic material particles, and as a result, a predetermined pore structure may be formed between the inorganic material particles that are fixed between the binder polymers. Due to the pore structure, ions may smoothly move from the cathode to the anode even if the separator is coated with the inorganic material particles. Also, the binder polymer may stably maintain the inorganic material particles on the separator and thus, mechanical stability may also be improved. Furthermore, the binder polymer may more stably bond the separator to the electrode. As a reference, the separator may be formed of a polyolefin-based separator material.

As illustrated in FIGS. 17 and 18, the first separator 112 has the electrodes 111 and 113 on both sides thereof, but the second separator 114 has the electrode 113 on only one side thereof. Thus, the both sides of the first separator 112 may be coated with the coating material, and the only one side of the second separator 114 may be coated with the coating material. That is, the both sides of the first separator 112 respectively facing the first electrode 111 and the second electrode 113 may be coated with the coating material, and the only one side of the second separator 114 facing the second electrode 113 may be coated with the coating material.

It may be sufficient that the bonding by the coating material is performed in the inside of the unit structure 110. Thus, as described above, the only one side of the second separator 114 may be coated. However, since the unit structures 110 may also be bonded to each other by a method such as heat pressing, both sides of the second separator 114 may also be coated if necessary. That is, the one side facing the second electrode 113 and the opposite side thereto of the second separator 114 may also be coated with the coating material. In this case, the unit structure 110 disposed on an upper side and the unit structure 110 disposed directly thereunder may be bonded together through the coating material on the outer surface of the second separator 114.

As a reference, in the case that the separator is coated with the coating material having adhesiveness, it is undesirable to directly apply pressure to the separator with a predetermined object. The separator typically extends longer than the electrode to the outer side. Thus, there may be an attempt to combine an end of the first separator 112 and an end of the second separator 114 together. For example, there may be an attempt to fuse the end of the first separator 112 and the end of the second separator 114 together by ultrasonic welding, and with respect to the ultrasonic welding, it is necessary to directly apply pressure to an object with a horn. However, when the pressure is directly applied to the end of the separator with the horn, the horn may be adhered to the separator due to the coating material having adhesiveness. As a result, failure of the device may occur. Therefore, in the case that the separator is coated with the coating material having adhesiveness, it is undesirable to use a process that directly applies pressure to the separator with a predetermined object.

The electrode assembly 100 may further include at least one of a first auxiliary unit 130 and a second auxiliary unit 140. First, the first auxiliary unit 130 will be described. The unit structure 110 is formed by sequentially stacking the first electrode 111, the first separator 112, the second electrode 113, and the second separator 114 from a top side to a bottom side thereof or from the bottom side to the top side. Thus, when the electrode assembly 100 is formed by repeatedly stacking the unit structures 110, the first electrode 111 (116, hereinafter, referred to as "first end electrode") is disposed at an uppermost side (see FIG. 17) or a lowermost side (see FIG. 18) of the electrode assembly 100 (the first end electrode may be a cathode or an anode). The first auxiliary unit 130 is further stacked on the first end electrode 116.

Figure 20:
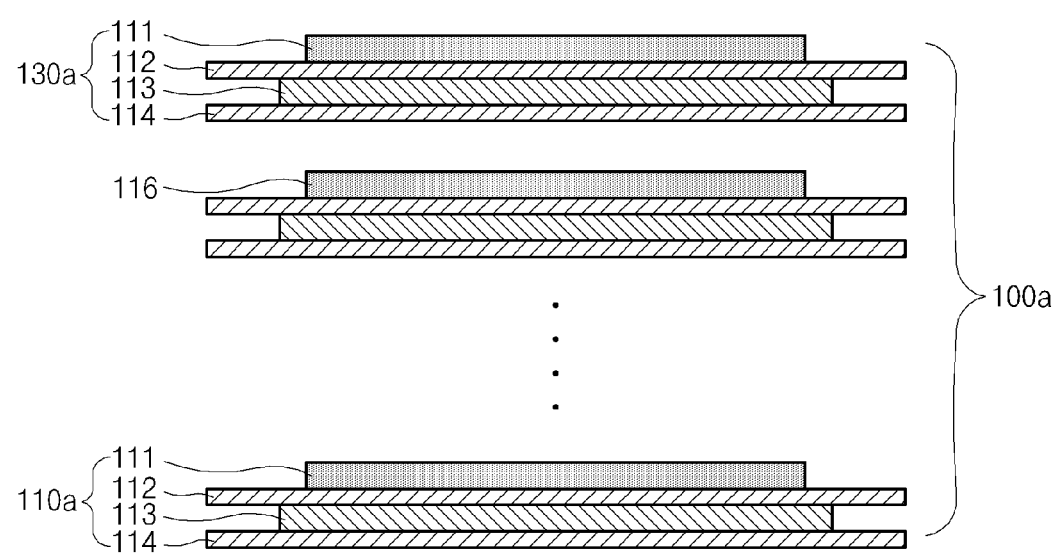
FIG. 20 is a side view illustrating a first structure of an electrode assembly including unit structures and a first auxiliary unit.
Figure 21:
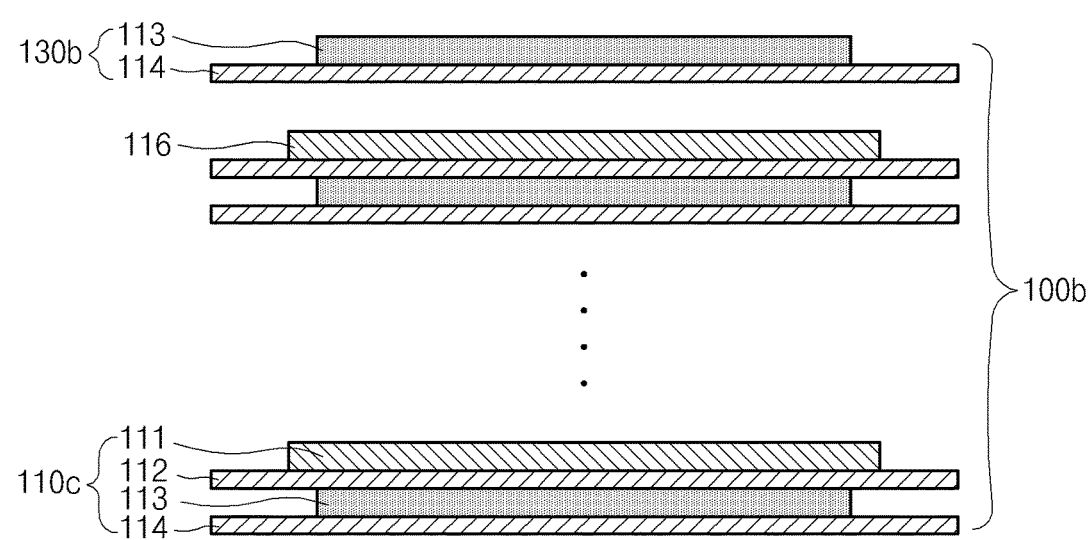
FIG. 21 is a side view illustrating a second structure of an electrode assembly including unit structures and a first auxiliary unit.

Specifically, as illustrated in FIG. 20, when the first electrode 11 is a cathode and the second electrode 113 is an anode, a first auxiliary unit 130a may be formed by sequentially stacking the separator 114, the anode 113, the separator 112, and the cathode 111 from the first end electrode 116, i.e., from the first end electrode 116 to the outer side (top side on the basis of FIG. 20). Also, as illustrated in FIG. 21, when the first electrode 11 is an anode and the second electrode 113 is a cathode, a first auxiliary unit 130b may be formed by sequentially stacking the separator 114 and the cathode 113 from the first end electrode 116, i.e., from the first end electrode 116 to the outer side. In the electrode assembly 100, as illustrated in FIG. 20 or 21, the cathode may be disposed at the outermost side of the first end electrode 116 due to the first auxiliary unit 130.

In general, an electrode includes a current collector and an active material layer (active material), and both sides of the current collector are coated with the active material layer. Accordingly, on the basis of FIG. 20, the active material layer disposed under the current collector among the active material layers of the cathode may react with the active material layer disposed above the current collector among the active material layers of the anode by the medium of the separator. When the unit structures 110 are formed in the same manner and the unit structures 110 are then sequentially stacked to form the electrode assembly 100, the first end electrode 116 disposed at the uppermost side or the lowermost side of the electrode assembly 100 inevitably includes the active material layers on both sides of the current collector similar to the first electrode 111. However, when the first end electrode has a structure in which the both sides of the current collector are coated with the active material layer, the active material layer disposed on the outer side among the active material layers of the first end electrode may not react with other active material layers. Thus, a problem occurs in which the active material layer is wasted.

The first auxiliary unit 130 is for addressing the above problem. That is, the first auxiliary unit 130 is formed separately from the unit structure 110. Thus, the first auxiliary unit 130 may include a cathode in which only one side of the current collector is coated with the active material layer. That is, the first auxiliary unit 130 may include the cathode in which the only one side facing the unit structure 110 (one side facing downward on the basis of FIG. 20) of the both sides of the current collector is coated with the active material layer. As a result, when the electrode assembly 100 is formed by further stacking the first auxiliary unit 130 on the first end electrode 116, the cathode having only one side coated may be disposed at the outermost side of the first end electrode 116. Therefore, the problem of the waste of the active material layer may be addressed. Since the cathode, for example, is configured to release nickel ions, it is advantageous for a battery capacity to dispose the cathode at the outermost side.

Next, the second auxiliary unit 140 will be described. The second auxiliary unit 140 basically plays the same role as the first auxiliary unit 130. The second auxiliary unit 140 will be described in more detail. The unit structure 110 is formed by sequentially stacking the first electrode 111, the first separator 112, the second electrode 113, and the second separator 114 from a top side to a bottom side thereof or from the bottom side to the top side. Thus, when the electrode assembly 100 is formed by repeatedly stacking the unit structures 110, the second separator 114 (117, hereinafter, referred to as "second end separator") is disposed at an uppermost side (see FIG. 18) or a lowermost side (see FIG. 17) of the electrode assembly 100. The second auxiliary unit 140 is further stacked on the second end separator 117.

Figure 22:
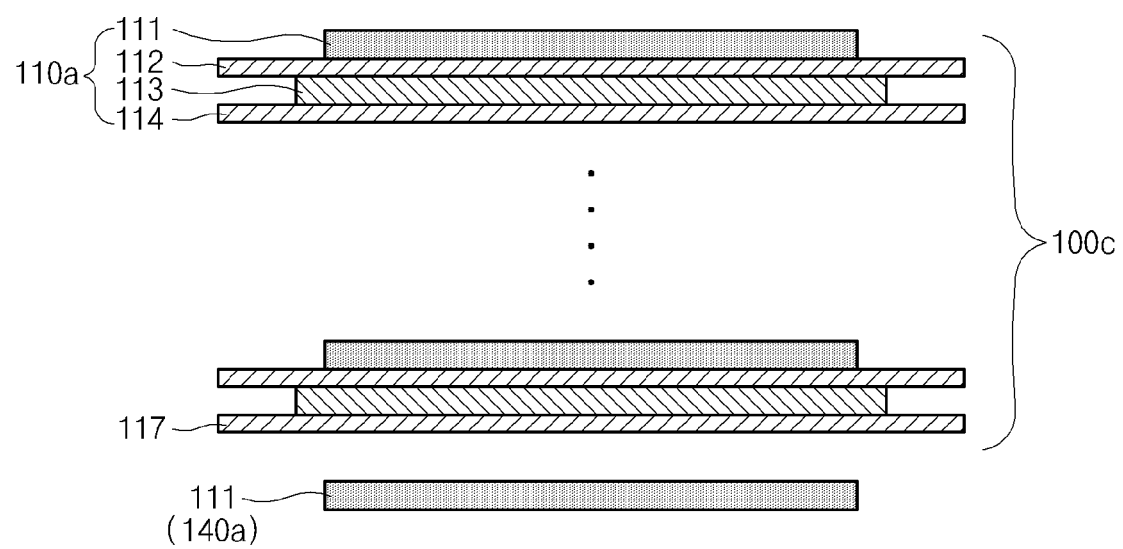
FIG. 22 is a side view illustrating a third structure of an electrode assembly including unit structures and a second auxiliary unit.
Figure 23:
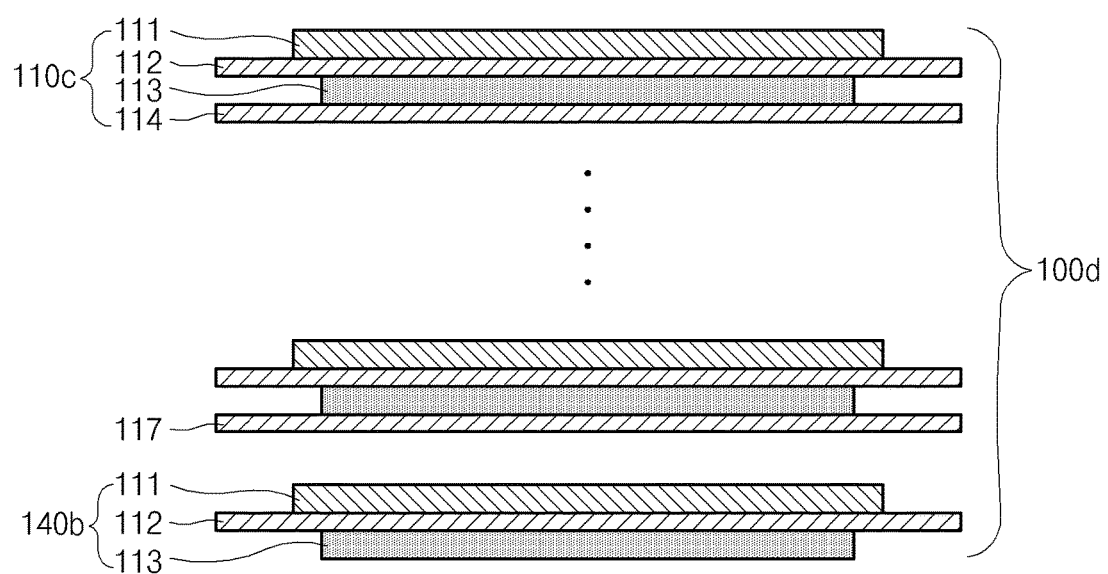
FIG. 23 is a side view illustrating a fourth structure of an electrode assembly including unit structures and a second auxiliary unit.

Specifically, as illustrated in FIG. 22, when the first electrode 11 is a cathode and the second electrode 113 is an anode, a second auxiliary unit 140a may be formed as the cathode 111. Also, as illustrated in FIG. 23, when the first electrode 11 is an anode and the second electrode 113 is a cathode, a second auxiliary unit 140b may be formed by sequentially stacking the anode 111, the separator 112, and the cathode 113 from the second end separator 117, i.e., from the second end separator 117 to the outer side (bottom side on the basis of FIG. 23). Similar to the first auxiliary unit 130, the second auxiliary unit 140 may also include a cathode in which only one side facing the unit structure 110 (one side facing upward on the basis of FIG. 23) of both sides of the current collector is coated with the active material layer. As a result, when the electrode assembly 100 is formed by further stacking the second auxiliary unit 140 on the second end separator 117, the cathode having only one side coated may be disposed at the outermost side of the second end separator 117.

As a reference, FIGS. 20 and 21 and FIGS. 22 and 23 exemplify the case in which the first electrode 111, the first separator 112, the second electrode 113, and the second separator 114 are sequentially stacked from the top side to the bottom side. Conversely, the case, in which the first electrode 111, the first separator 112, the second electrode 113, and the second separator 114 are sequentially stacked from the bottom side to the top side, may also be described in the same way as described above. The first auxiliary unit 130 and the second auxiliary unit 140 may further include a separator at the outermost side if necessary. For example, in the case that it is necessary for the cathode disposed at the outermost side to be electrically insulated from the case, the first auxiliary unit 130 and the second auxiliary unit 140 may further include a separator at the outer side of the cathode. For the same reason, as illustrated in FIG. 22, a separator may be further included in the cathode that is exposed to a side opposite to a side on which the second auxiliary unit 140 is stacked (i.e., uppermost side of the electrode assembly 100 of FIG. 22).

Figure 24:
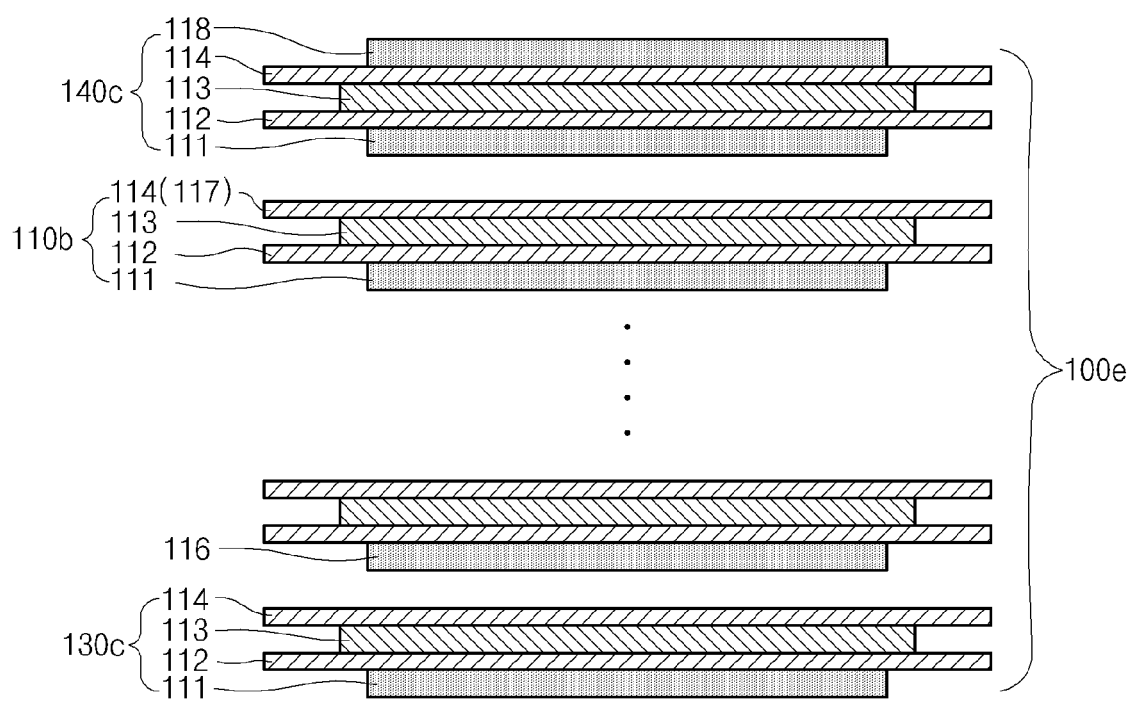
FIG. 24 is a side view illustrating a fifth structure of an electrode assembly including unit structures, a first auxiliary unit, and a second auxiliary unit.
Figure 25:
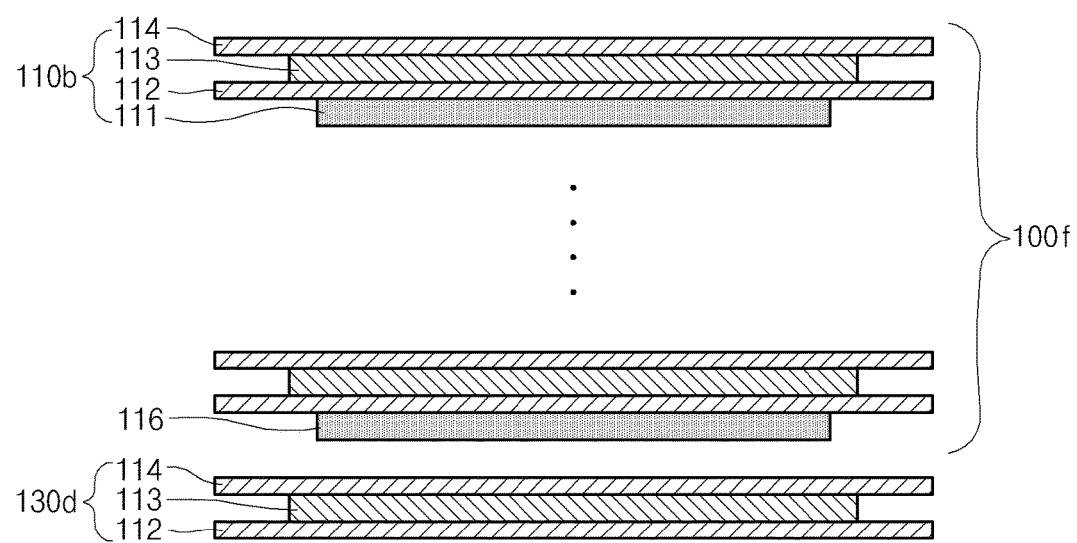
FIG. 25 is a side view illustrating a sixth structure of an electrode assembly including unit structures and a first auxiliary unit.
Figure 26:
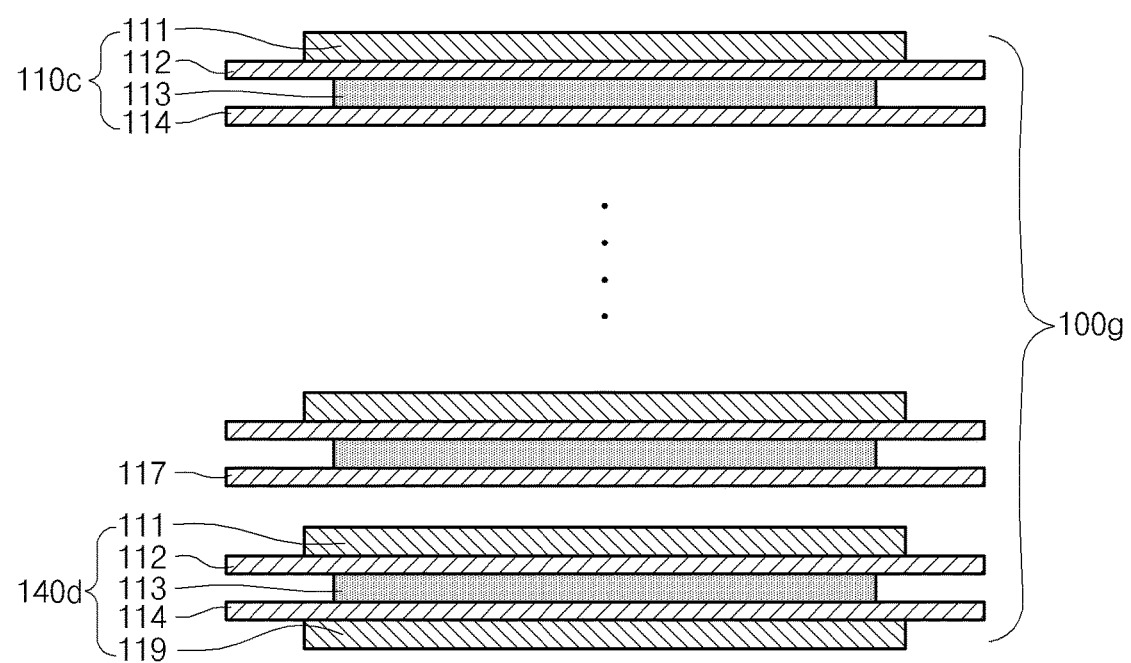
FIG. 26 is a side view illustrating a seventh structure of an electrode assembly including unit structures and a second auxiliary unit.

It is desirable to form the electrode assemblies 100 as illustrated in FIGS. 24 to 26. First, an electrode assembly 100e may be formed as illustrated in FIG. 24. The unit structure 110b may be formed by sequentially stacking the first electrode 111, the first separator 112, the second electrode 113, and the second separator 114 from the bottom side to the top side. In this case, the first electrode 111 may be a cathode and the second electrode 113 may be an anode. A first auxiliary unit 130c may be formed by sequentially stacking the separator 114, the anode 113, the separator 112, and the cathode 111 from the first end electrode 116, i.e., from the top side to the bottom side on the basis of FIG. 24. In this case, the active material layer may be formed only on one side of the cathode 111 of the first auxiliary unit 130c facing the unit structure 110b.

Also, a second auxiliary unit 140c may be formed by sequentially stacking the cathode 111 (first cathode), the separator 112, the anode 113, the separator 114, and a cathode 118 (second cathode) from the second end separator 117, i.e., from the bottom side to the top side on the basis of FIG. 24. In this case, the active material layer may be formed only on one side of the cathode 118 (second cathode) disposed at the outermost side of the cathodes of the second auxiliary unit 140c facing the unit structure 110b. As a reference, it is advantageous for the alignment of the unit structure when the auxiliary unit includes the separator.

Next, an electrode assembly 100f may be formed as illustrated in FIG. 25. The unit structure 110b may be formed by sequentially stacking the first electrode ill, the first separator 112, the second electrode 113, and the second separator 114 from the bottom side to the top side. In this case, the first electrode 111 may be a cathode and the second electrode 113 may be an anode. A first auxiliary unit 130d may be formed by sequentially stacking the separator 114, the anode 113, and the separator 112 from the first end electrode 116. In this case, the second auxiliary unit may not be included. As a reference, the anode may react with an aluminum layer of the pouch case 200 due to a potential difference. Thus, it is desirable for the anode to be insulated from the pouch case 200 through the separator.

Finally, an electrode assembly 100g may be formed as illustrated in FIG. 26. The unit structure 110c may be formed by sequentially stacking the first electrode 111, the first separator 112, the second electrode 113, and the second separator 114 from the top side to the bottom side. In this case, the first electrode 111 may be an anode and the second electrode 113 may be a cathode. A second auxiliary unit 140d may be formed by sequentially stacking the anode 111, the separator 112, the cathode 113, the separator 114, and an anode 119 from the second end separator 117. In this case, the first auxiliary unit may not be included.

Figure 27:
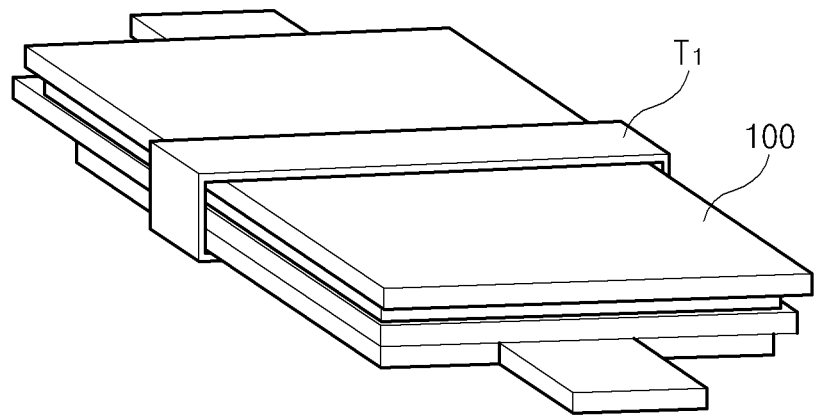
FIG. 27 is a schematic perspective view illustrating fixing structures of an electrode assembly according to the present invention.
Figure 27:
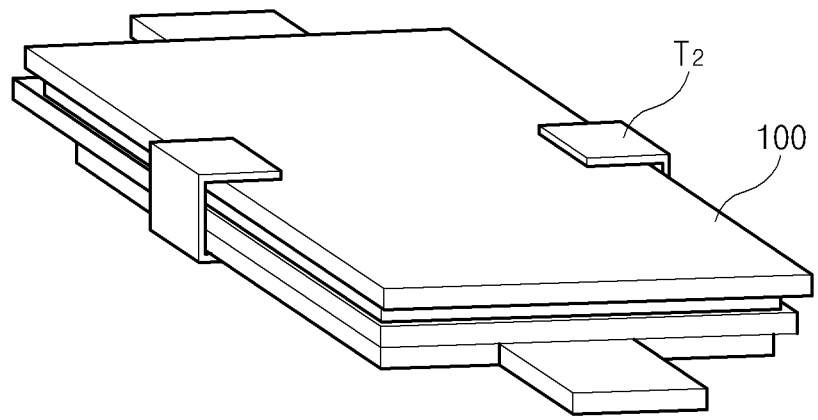

Hereinafter, a fixing structure of the electrode assembly 100 according to the present invention will be described with reference to FIG. 27.

The electrode assembly 100 according to the present invention may further include a fixing part T1 fixing a side or a front side of the unit structure 110 or the electrode assembly 100 having a structure in which the unit structures 110 are stacked.

That is, in order to secure the stability of the stack structure, the side of the electrode assembly 100 may be fixed by using a separate member, and the fixing part may be realized by a method of taping the font side of the stacked electrode assembly 100 as illustrated in FIG. 27(a), or may be realized as a fixing part T2 fixing only the side of the electrode assembly 100 as illustrated in FIG. 27(b). Also, with respect to FIGS. 27(a) and 27(b), a polymer tape may be used as the fixing part.

While the present invention has been shown and described in connection with the exemplary embodiments, it will be apparent to those skilled in the art that modifications and variations can be made without departing from the spirit and scope of the invention as defined by the appended claims.

The invention claimed is:

1. A method of preparing an electrode assembly, the method comprising:

forming recessed portions recessed from edges of a first electrode and a second electrode toward inner sides thereof (S11);

forming a unit structure having a four-layer structure, in which the first electrode, a first separator, the second electrode, a second separator are sequentially stacked, or a structure in which the four-layer structures are repeatedly stacked, or having the four-layer structure or a structure, in which the four-layer structures are repeatedly arranged, by stacking two kinds or more of radical units, in which the first electrode, the first separator, the second electrode, and the second separator are alternatingly disposed and integrally combined, one by one in a predetermined sequence (S20);

after forming the unit structure, forming recessed portions in the first separator and the second separator by cutting regions of the first separator and the second separator included in the unit structure corresponding to the recessed portions with a margin (S31); and after forming the recessed portions in the first separator and the second separator, forming an electrode assembly by stacking the plurality of unit structures to allow the recessed portions of the adjacent unit structures to face each other (S41).

2. The method of claim 1, wherein the recessed portions formed in any one of the unit structures have a different size from that of the recessed portions formed in the adjacent unit structure.

3. A method of preparing an electrode assembly, the method comprising:

forming recessed portions recessed from edges of a first electrode and a second electrode toward inner sides thereof (S11);

forming a unit structure having a four-layer structure, in which the first electrode, a first separator, the second electrode, a second separator are sequentially stacked, or a structure in which the four-layer structures are repeatedly stacked, or having the four-layer structure or a structure, in which the four-layer structures are repeatedly arranged, by stacking two kinds or more of radical units, in which the first electrode, the first separator, the second electrode, and the second separator are alternatingly disposed and integrally combined, one by one in a predetermined sequence (S20);

forming recessed portions in the first separator and the second separator by cutting regions of the first separator and the second separator included in the unit structure corresponding to the recessed portions with a margin (S31); and forming an electrode assembly by stacking the plurality of unit structures to allow the recessed portions of the adjacent unit structures to face each other (S41), wherein the size of the recessed portions of each of the first electrodes, of each of the first separators, of each of the second electrodes, and of each of the second separators gradually increases from a top surface of the electrode assembly to a bottom surface thereof, or wherein the size of the recessed portions of each of the first electrodes, of each of the first separators, of each of the second electrodes, and of each of the second separators gradually decreases from a top surface of the electrode assembly to a bottom surface thereof.

4. The method of claim 1, wherein the unit structure is formed by bonding the electrodes and the separators to one another.

5. The method of claim 4, wherein the bonding of the electrodes and the separators is performed by applying pressure or applying heat and pressure to the electrodes and the separators.

6. The method of claim 4, wherein the unit structure is formed by laminating the electrodes and the separators.

7. The method of claim 4, wherein surfaces of the separators are coated with a coating material having adhesiveness.

8. The method of claim 7, wherein the coating material is a mixture of inorganic material particles and a binder polymer.

9. The method of claim 7, wherein both sides of the first separator respectively facing the first electrode and the second electrode are coated with the coating material and only one side of the second separator facing the second electrode is coated with the coating material.

10. The method of claim 7, wherein both sides of the first separator respectively facing the first electrode and the second electrode are coated with the coating material and one side facing the second electrode and an opposite side thereto of the second separator are coated with the coating material, wherein the plurality of unit structures included in the electrode assembly are bonded each other by the coating material of the second separator.

11. The method of claim 1, further comprising a fixing part fixing a side or a front side of the electrode assembly.

12. The method of claim 11, wherein the fixing part is realized by using a polymer tape taping the side or the front side of the electrode assembly.

13. A method of preparing a lithium secondary battery, the method comprising steps of:

forming recessed portions recessed from edges of a first electrode and a second electrode toward inner sides thereof (S11);

forming a unit structure having a four-layer structure, in which the first electrode, a first separator, the second electrode, a second separator are sequentially stacked, or a structure in which the four-layer structures are repeatedly stacked, or having the four-layer structure or a structure, in which the four-layer structures are repeatedly arranged, by stacking two kinds or more of radical units, in which the first electrode, the first separator, the second electrode, and the second separator are alternatingly disposed and integrally combined, one by one in a predetermined sequence (S20);

forming recessed portions in the first separator and the second separator by cutting regions of the first separator and the second separator included in the unit structure corresponding to the recessed portions with a margin (S31);

forming an electrode assembly by stacking the plurality of unit structures to allow the recessed portions of the adjacent unit structures to face each other (S41); and accommodating the electrode assembly in a pouch case and forming regions of the pouch case other than a vertical projection plane of the electrode assembly as fused portions (S50), wherein a portion of the fused portions protrudes into the recessed portions of the first and second separators.

14. The method of claim 13, wherein step S50 comprises a process of cutting a smaller area than the recessed portion of the first separator and the second separator out of the region of the fused portions corresponding to the recessed portions.

15. The method of claim 14, wherein the process of cutting the fused portions is performed by laser cutting, ultrasonic cutting, and die cutting.

16. The method of claim 13, wherein step S41 is performed after step S31 and prior to step S50.

* * * * *